(12) United States Patent  
Chelaidite (10) Patent No.: US 8,397,880 B2  
(45) Date of Patent: Mar. 19, 2013

(54) PAD RETRACTION DEVICE

(75) Inventor: Galus Chelaidite, South Lyon, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 359 days.

(21) Appl. No.: 12/788,806

(22) Filed: May 27, 2010

(65) Prior Publication Data

US 2011/0168503 A1   Jul. 14, 2011

(51) Int. Cl.
    *F16D 65/40*   (2006.01)
(52) U.S. Cl. ............ 188/73.38; 188/73.31; 188/73.36; 188/73.37; 188/73.39
(58) Field of Classification Search .......... 188/73.31, 188/73.36–73.39
See application file for complete search history.

(56) References Cited

U.S. PATENT DOCUMENTS

| | | | |
|---|---|---|---|
| 4,245,723 A | 1/1981 | Moriya | |
| 4,364,455 A | 12/1982 | Oshima | |
| 4,491,204 A | 1/1985 | Dirauf et al. | |
| 4,658,938 A | 4/1987 | Thiel et al. | |
| 4,666,025 A | 5/1987 | Rubin | |
| 4,969,540 A * | 11/1990 | Cartwright et al. | 188/73.36 |
| 5,069,313 A | 12/1991 | Kato et al. | |
| 5,249,647 A | 10/1993 | Kobayashi et al. | |
| 5,251,727 A | 10/1993 | Loeffler et al. | |
| 5,511,638 A | 4/1996 | Tsuruta | |
| 5,538,103 A | 7/1996 | Rueckert et al. | |
| 5,549,181 A | 8/1996 | Evans | |
| 5,699,882 A | 12/1997 | Ikegami et al. | |
| 5,901,815 A * | 5/1999 | Kobayashi et al. | 188/7 |
| 5,934,417 A | 8/1999 | Kobayashi et al. | |
| 5,941,348 A | 8/1999 | Matsumoto et al. | |
| 5,947,233 A * | 9/1999 | Kobayashi et al. | 188/72.3 |
| 6,003,642 A | 12/1999 | Mori et al. | |
| 6,286,636 B1 | 9/2001 | Iwata | |
| 6,378,665 B1 | 4/2002 | McCormick | |
| 6,378,666 B1 * | 4/2002 | Yoko | 188/73.38 |
| 6,478,122 B1 | 11/2002 | Demoise et al. | |
| 6,527,090 B1 | 3/2003 | Barillot et al. | |
| D473,127 S * | 4/2003 | Yoko | D8/395 |
| D483,709 S | 12/2003 | Byrd | |
| 6,678,666 B1 | 1/2004 | Boulware | |
| 6,719,105 B1 | 4/2004 | Wemple | |

(Continued)

FOREIGN PATENT DOCUMENTS

EP    2299142 A1   3/2011
GB    2172068 A    9/1986

(Continued)

OTHER PUBLICATIONS

Co-pending application, U.S. Appl. No. 13/011,971, dated Jan. 24, 2011.

(Continued)

*Primary Examiner* — Robert A Siconolfi
*Assistant Examiner* — James Hsiao
(74) *Attorney, Agent, or Firm* — The Dobrusin Law Firm, P.C.

(57) ABSTRACT

A clip comprising: a body portion; one or more arms connected to the body portion and projecting away from the body portion; a deformable portion of the one or more arms that is distal from the body portion; and a lip on the one or more arms that is proximate to the body portion.

20 Claims, 5 Drawing Sheets

U.S. PATENT DOCUMENTS

| | | | |
|---|---|---|---|
| D489,655 S | 5/2004 | Byrd | |
| 6,920,965 B2 | 7/2005 | Burgdorf et al. | |
| 6,959,792 B2 | 11/2005 | Ashman et al. | |
| 7,163,089 B2 * | 1/2007 | Nogiwa | 188/73.38 |
| 7,219,773 B2 * | 5/2007 | Ono | 188/73.38 |
| 7,308,974 B2 | 12/2007 | Barbosa | |
| 7,455,153 B2 | 11/2008 | Ooshima et al. | |
| 7,467,693 B2 | 12/2008 | Barbosa | |
| 7,513,340 B2 | 4/2009 | Hendrich et al. | |
| 7,644,809 B2 | 1/2010 | Cortinovis et al. | |
| 7,766,131 B2 | 8/2010 | Hayashi | |
| 8,020,674 B2 | 9/2011 | Miura et al. | |
| 2002/0189911 A1 | 12/2002 | Layton | |
| 2006/0037821 A1 | 2/2006 | Barbosa et al. | |
| 2006/0070828 A1 * | 4/2006 | Hendrich et al. | 188/73.31 |
| 2007/0029148 A1 * | 2/2007 | Jedele | 188/250 G |
| 2007/0251772 A1 * | 11/2007 | Tsurumi | 188/73.38 |
| 2012/0205205 A1 | 8/2012 | Lethorn | |

FOREIGN PATENT DOCUMENTS

| | | |
|---|---|---|
| JP | 56-21633 U | 2/1981 |
| JP | 08-261261 A | 10/1996 |
| JP | 08284983 A | 11/1996 |
| JP | 2001336554 | 12/2001 |

OTHER PUBLICATIONS

Co-pending application, U.S. Appl. No. 13/024,357, dated Feb. 10, 2011.

* cited by examiner

PAD RETRACTION DEVICE

FIELD OF THE INVENTION

The present invention generally relates to a clip for use with brake pads whose function is to move the brake pads away from the rotor, and to center the brake pads over the rotor.

BACKGROUND OF THE INVENTION

Typical disc brake systems include a support bracket, one or more brake pads, a caliper, and a rotor. The one or more brake pads are mounted and located in the support bracket so that the brake pads slide axially towards and away from the rotor. The disc brake system may include a clip that attaches to the support bracket and to a portion of the one or more brake pads so that the brake pads are held in the support bracket. The brake pad may further include another clip that covers one or more ears of the brake pad. The disc brake system may include one or more springs that attach to the brake pads to retract the brake pads. The use of one or more clips, one or more springs, or a combination thereof adds additional parts to the braking system and increases the complexity and cost of the brake system. The addition of one or more clips and/or one or more springs may require modifications to be made to the support bracket, brake pads, caliper, or a combination thereof so that the spring and/or clip may be used. Thus, a modification to one or more parts of the support bracket, to the caliper, to the one or more brake pads, or a combination thereof may require modifications to a spring and/or a clip. It is believed that the addition of one or more clips and/or one or more springs can adversely affect the vibration and/or noise performance of the braking system.

For many years, industry has been concerned with improving the design of braking systems for use with automotive vehicles or other modes of transportation. More recently, reducing fuel consumption has become an increasing concern among vehicle manufacturers and vehicle owners. One cause that affects fuel consumption is by brake drag caused by contact forces between the one or more brake pads and the vehicle's rotor. Examples of brake clips and brake springs are disclosed in U.S. Pat. Nos. D483,709S; D489,655; 7,308, 974; 7,467,693; and U.S. Patent Application Publication 2002/0189911, all of which are expressly incorporated by reference herein for all purposes.

One challenge faced by brakes is providing brake pads that retract after each brake apply so that the brake pad contact with the rotor is reduced as much as possible. Historically, springs have been added between the brake pads so that the when a brake apply is complete the one or more springs push the two pads apart and away from the rotor. Typically, these springs deform elastically as the brake pads and the rotors wear so that the retraction load against the brake pads increases proportionally to wear, which may affect braking feel. Further, these springs do not center the brake pads in relationship to the rotor and/or support bracket; thus, the springs may push one brake pad away from the rotor and allow the other brake pad to remain in contact with the rotor.

Another challenge faced by brakes is brake squeal and brake rattle. Adding one or more clips and one or more springs increases the opportunities for brake noise, brake squeal, vibration, rattling, or a combination thereof. It is further contemplated that brake squeal and/or brake rattle may be caused by contact between two dissimilar metals. For example, the clip may be made of one material and the brake pad may be made of another material. The brake pad may move relative to the clip and may rub against the clip; this rubbing may cause brake squeal.

Another problem faced is that the brake pad may corrode and the corrosion on the brake pad may cause the brake pads to rub against the clip and make noise during a brake apply and/or brake retract. Typically, the brake pads are painted so that corrosion of the brake pad is inhibited. However, the paint may be removed from the brake pad as the brake pad travels back and forth during repeated brake retracts and brake applies. Once the paint has been removed the metallic brake pad may corrode more easily and cause brake noise. The brake pad and clip are also exposed to an environment where debris can accumulate and, thus, increase pad slide load and/ or brake noise. The present invention provides an elegantly simple solution to all of these problems, without introducing other undesirable effects such as brake noise.

SUMMARY OF THE INVENTION

One possible embodiment of the present invention includes: a clip comprising: a body portion; one or more arms connected to the body portion and projecting away from the body portion; a deformable portion of the one or more arms that is distal from the body portion; and a lip on the one or more arms that is proximate to the body portion.

One unique aspect of the present invention envisions a clip that holds an ear of a brake pad in place. The present invention further includes retraction characteristics so that an air gap may be maintained. The clip may assist in moving the brake pad after the brakes are released so that the brake pads retract substantially away from the rotor. The clip further assists in maintaining an air gap on both sides of the rotor that are substantially similar in size.

The present inventor has further identified that by adding deformable portions the clip may permanently deform so that the retraction force remains substantially constant. The present invention may permanently deform so that as the brake pad and/or rotor wears the clip deforms and maintains a constant retraction force so that the available air gap is maintained. The deformable portions may also temporarily deform during each brake apply so that the clip assists in retracting the brake pads.

Another unique aspect of the present invention envisions that the ear of the brake pad is maintained in the same relative position to an overlapping portion of the brake pad arms during a brake apply. Thus, only the overlapping portions of the clip move over and contact each other during a brake apply. The overlapping portions may be self cleaning so that any debris is removed from the overlapped portion and friction and/or noise is minimized. It is contemplated that the overlapping portions are made of a material that is corrosion resistant. Thus, the present invention will reduce fuel consumption without causing brake noise.

DETAILED DESCRIPTION OF THE INVENTION

The following description of the preferred embodiment(s) is merely exemplary in nature and is in no way intended to limit the invention, its application, or uses.

The present invention is predicated upon providing an improved disc brake system and caliper for use with vehicles. For example, a clip may be used with almost any vehicle (e.g. car, truck, bus, train, airplane, or the like). Alternatively, the caliper may be integrated into assemblies used for manufacturing or other equipment that require a brake such as a lathe, winder for paper products or cloth, amusement park rides, or the like. However, the present invention is most suitable for use with a passenger vehicle (i.e. a car, truck, sports utility vehicle, or the like).

Generally, a braking system includes a rotor, a caliper body, and a support bracket. The caliper body includes an inboard brake pad and an outboard brake pad that are located on opposing sides of the rotor. The caliper body further includes a bridge, one or more fingers, and a piston bore. The piston bore houses a piston. The piston bore may include a fluid inlet, a closed wall, a front opening, a cylindrical side wall that includes an annular groove located near the front opening, and a seal in the annular groove. The support bracket may include one or more clips that assist in holding the one or more brake pads. The support bracket may include one or more springs attached to the one or more brake pads, the support bracket, or both.

The present invention is a clip that is adapted to hold the one or more brake pads as well as assist in retracting the one or more brake pads. The clip includes a body portion, one or more arms, a deformable portion on the one or more arms, and a lip on the one or more arms. The body portion may be any shape capable of use with a support bracket of a brake and a brake pad that includes one or more ears. Preferably, the shape of the body portion of the clip may substantially follow or match the shape of the support bracket so that the clip fits in the support bracket and an ear of the brake pad can be mounted in the support bracket and clip so that the brake pad may be held in place. More preferably, the shape of the body portion of the clip will be such that the clip fits in an abutment and around a top arm portion of the support bracket and forms an interference fit holding the clip in place. A portion of the clip may not follow or match the support bracket.

The clip may include a bridge portion. The clip may be free of a bridge portion. The bridge portion may be a portion of the clip that connects the body portion together. The bridge portion may pass over the rotor. The bridge portion may connect two body portions so that the rotor passes under the bridge portion and between the two body portions. The clip may not include a bridge portion; thus, two discrete clips may be formed. The two discrete clips without a bridge portion may be identical in all other aspects to a clip with a bridge portion.

The brake system may include one or more clips. Preferably, the brake system includes at least two clips. More preferably, a first clip is placed one side of the one or more brake pads and a second clip is placed on the opposite side of the one or more brake pads. The brake system may include three clips. Preferably, the brake system includes four clips. More preferably, two clips are placed on each side of the rotor and two clips are placed opposite sides of the one or more brake pads. It is contemplated that any of the configurations discussed herein may be employed in the one, two, three, four, or more clip designs discussed herein.

The clip may include one or more arms that project from the body portion. Preferably, the clip includes two arms. Preferably, a clip that includes two arms may have the two arms projecting away from each other. More preferably, the two arms project away from the rotor. The clip may include only one arm. The clip may include one arm that projects out from one side of the clip. Another clip may include one arm the projects out from the opposite side of the clip. There may be a "right" side clip and a "left" side clip. Preferably, when more than two clips are used a right side clip and a left side clip are placed on opposite sides of the rotor so that the right side clip has an arm that projects to the right and away from the rotor and the left clip has an arm that projects to the left and away from the rotor when viewing the clip and support bracket so that the lip of the clip is visible.

The one or more arms may project laterally from the body portion, longitudinally from the body portion, or a combination thereof. Preferably, the one or more arms may project out from the sides of the body portion. More preferably, the one or more arms may project out from the sides of the body portion and then extend substantially perpendicular to the one or more arms, body portion, or both. The one or more arms may be planar with the body portion. Preferably, the one or more arms may be substantially planar with the body portion and may have one or more curved portions that are not planar with the body portion. More preferably, the one or more arms may be substantially planar and include one or more substantially perpendicular portions that project away from the arms, the body portion, or both. The one or more arms may project out from the body of the clip and make a "U" shaped turn back towards the body of the clip.

The arms may be a single piece of material. Preferably, the arms may include one piece of material that overlaps upon itself. More preferably, the one piece of material overlaps itself and the overlapped portions are substantially in contact. The arms may be one or more pieces of material. Preferably, the arm may be one discrete portion and the body may be one discrete portion and the arms and body are removably attached to each other. More preferably, the arm may be one discrete portion and the body may be one discrete portion and the arms and body are fixedly attached to each other. The arms may be removably attached to the body portion.

The arms and the body portion may be made of the same material. The arms and body portion may be made of different materials. The arms may be made of any material that has springing properties. Preferably, the clip (i.e. arms, body portion, or both) may be made of metal. The clip may be made of titanium, aluminum, steel, copper, iron, nickel, cobalt, or a combination thereof. More preferably, the arms may be made of stainless steel. Even more preferably yet, the clip may be made of a material that has a 301 ¾H when measured by ASTM A666 or may be SU301-CSP ¾H when measured by JIS G4313. Preferably, the clip is made of 301 ¾H stainless steel. The clip may be made of a material that is resistant to corrosion. The clip may be made of any material capable of being formed. The clip may be made of a material that is deformable. Preferably, the clip may be made of a material that is elastically deformable (e.g. a lip returns substantially to its original position). More preferably, the clip may be made of a material that is plastically deformable (e.g. a lip moves towards its original position but not back to its original position). The clip may be made of any material configuration (i.e. sheet, roll, coil, block, molten material, liquid material, or the like). The clip may be formed by any process capable of creating a clip with arcuate portions. The clip may be formed by casting, stamping, cutting, bending, molding, deep drawing, spinning, press brake forming, roll forming, ironing, wheeling, incremental sheet forming, decambering, or a combination thereof. Preferably, the clip may be made from a metallic sheet, a coil, a roll, or a combination thereof. More preferably, the clip may be made from a stainless steel sheet, coil, roll, or a combination thereof.

The one or more arms may be made of any material capable of assisting in retracting the one or more brake pads. The arms may be made of a molded material. The one or more arms may be made of a flattened material. The one or more arms may be made of wire. The wire may be any shape suitable for use as an arm. For example, the arm may have a cross-section that is circular, rectangular, triangular, oval, diamond, or the like. The arm may have a deformable area. The deformable area of the arm may vary based on the length, width, thickness, diameter, or a combination thereof of the arm. Changing one or more of these variables may change the ease and/or difficulty of deforming the one or more arms. A wire arm may have a constant diameter across its length and the length of the arm may be varied to change the ease and/or difficulty in deforming the arm. For example, a longer arm may deform more easily than a shorter arm. In another example, the length of the wire may be held constant and the diameter of the wire may be varied so that the ease or difficulty in deforming the arm may be varied (i.e. a thinner gauge wire may deform more easily). The length of the arm from the arcuate portion near the body to the arcuate portion near the lip may have a length. The length of the arm may be any length suitable so that the arm may assist in retracting the brake pads. The length of the arm may be any suitable length so that the arm deforms (i.e. temporarily or permanently). The length of the arm may be between about 5 mm and about 50 mm, preferably between about 10 mm and 40 mm, and more preferably between about 20 mm and 30 mm. The arm may have a diameter. The diameter of the arm may be any diameter suitable so that the arm may assist in retracting the brake pads. The diameter of the arm may be any diameter suitable so that the arm deforms. The diameter of the arm may be between about 0.05 mm and about 5.0 mm, preferably between about 0.1 mm and about 2.0 mm, and more preferably between about 0.6 mm and about 1.5 mm.

The arms may include one or more arcuate portions. The arms may include at least one arcuate portion. The one or more arcuate portions may form any angle. The one or more arcuate portions may form an angle that is greater than about 30 degrees, greater than about 45 degrees, greater than about 60 degrees, or even greater than about 90 degrees. Preferably, when an arm includes only one arcuate portion the angle is between about 90 degrees and about 270 degrees, preferably between about 125 degrees and about 225 degrees, more preferably between about 165 and about 205 degrees (i.e. about 180 degrees). The one or more arcuate portions may form an angle that is large enough that material is folded upon itself so that the material is two layers thick. The one or more arm portions may include one arcuate portion, two arcuate portions, three arcuate portions, four arcuate portions, five arcuate portions, or more. Preferably, the one or more arms may include three arcuate portions. The angles of the arcuate portions may be different. Preferably, the angles of the arcuate portions may be substantially the same. More preferably, the angles of two of the arcuate portions may be substantially the same, and the angle of the third arcuate portion may be different. Preferably, the first arcuate portion and the third arcuate portion may be substantially similar. The arcuate portions may have any angle between about 45 degrees and 135 degrees, preferably between about 60 degrees and about 120 degrees, more preferably between about 75 degrees and 105 degrees (i.e. about 90 degrees). The arcuate portions may have an angle between about 90 degrees and about 275 degrees, preferably between about 105 degrees and about 245 degrees, more preferably between about 135 degrees and about 225 degrees (i.e. about 180 degrees).

The one or more arcuate portions may form any shape capable of creating an overlapping portion so that during a brake apply the overlapping portion moves or loads and during a brake retract the overlapping portion moves or unloads so that the brake pads are moved to substantially the pre-brake position. The one or more arcuate portions may form a "T" shape, a "C" shape, a "J" shape, a "M" shape, a "U" shape, a "V" shape, a "W" shape, or a combination thereof. Preferably, the one or more arcuate portions may form an "L" shape. More preferably, the one or more arcuate portions may form two overlapping "L" shaped portions. It is contemplated that the arcuate portions may not create an overlap portion.

The arcuate portions may be deformable. However, the one or more arcuate portions may not be deformable. Preferably, one or more of the arcuate portions may be deformable. More preferably, all of the one or more arcuate portions may be deformable. The arcuate portions may be elastically deformable (i.e. temporarily deformable). For example, during a brake apply the force created may move a piston into contact with a brake pad and the brake pad may move a portion of the clip such that the angle of the arcuate portion is temporarily changed during the brake apply and then, upon brake release, the arcuate portion returns back to substantially the same angle as before the brake apply. The arcuate portion may be plastically deformable (i.e. permanently deformable). For example, during a brake apply the force created may move a brake pad and the brake pad may move a portion of the clip such that the angle of the arcute portion is changed during the brake apply and then after the brake apply the angle of the arcuate portion is different. However, the angle of the arcuate portion may not substantially change during brake apply.

In another embodiment, the arms may include one arcuate portion. The arcuate portion may not be deformable. However, the arcuate portion may be deformable. The one or more arms may include a discrete deformable portion. The deformable portion may be of any configuration so that it allows the one or more arms to elastically deform, plastically deform, or both. The one or more deformable portion may form a spiral, rectangle, slots, holes, ovals, diamonds, zigzag portions, or the like so that the arm may expand and contract. Preferably, the one or more deformable portion may include cuts so that the arms may move in the apply direction and the retract direction. More preferably, the one or more deformable portion may form a wavy configuration (i.e. one or more corrugated portions that may expand and/or may retract) so that the arm may move in the apply direction, the retract direction, or both. The deformable portion may deform as the brake pad wears so that the retraction force is substantially constant. Air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The air gap may be of any size that allows for braking. The air gap may be of any size that does not cause the brake pedal to have a soft feel or a long travel. Preferably, the air gap will be small (e.g. between about 0.05 mm to about 0.2 mm).

The deformable portion may permanently deform so that the clip compensates for the reduction in brake pad and/or rotor material. A new clip may be installed when new brake pads are installed in the brake system so that the new clip can deform as the new brake pads wear. It is contemplated that that if the clips are not replaced when new brake pads are installed the pad retraction function of the clip would not operate.

The deformable portion may have a point located in a plane. The plane of the deformable portion may be substantially perpendicular to the one or more arms. The deformation may occur substantially in-plane. For example, the deformable portion may be located in the one or more arms and not in an arcuate portion. The deformable portion may be substantially parallel to the body of the clip and include a point on a plane that is parallel to the body portion. The deformable portion may move so that when brake pressure is applied the point on the deformable portion may travel in the apply direction, which corresponds to the plane of the deformable portion (i.e. in-plane). The deformation may occur substantially out-of-plane. For example, the deformable portion may include a point that may be located in the one or more arcuate portions that are substantially perpendicular to the body portion of the clip. The clip may have a plane that is parallel to the body of the clip that passes through the point. The deformable portion may be pulled in the apply direction so that the point on the deformable portion, as it deforms, is pulled substantially out-of-plane (i.e. the point is pulled down when the clip moves in the apply direction).

The clip that includes an out-of-plane deformable portion may vary the amount of pressure exerted on the clip in the retract direction by varying the distance the point is moved from the plane. For example, the further the point is moved in the apply direction the more force the clip may apply on the brake pad in the retract direction. The clip that includes an in-plane deformable portion may vary the amount of pressure exerted on the clip in the retract direction by varying the distance the point is moved within the plane. For example, the further the point is moved in the apply direction the more force the clip may apply on the brake pad in the retract direction. In another example, the further the point is moved in the apply direction the more the clip may deform so that a constant force may be created in the retract direction (i.e. an out-of-plane clip may remain out of the original plane and create a new plane and an in-plane clip may remain in-plane, but in a different location along the plane).

The arms may include one or more openings. The openings may be located anywhere along the one or more arms. The one or more openings may be any absence of material that may weaken the deformable portions, to induce permanent deformation so that pad retraction load may be controlled. The openings may be a perforation in the arms such as a round hole, a square hole, diamond shaped hole, or any other shape that weakens the deformable portions of the one or more arms. Preferably, the openings may be a window. However, it is contemplated that the arms may not include an opening. The arms may include a portion where material has been removed but there is no through hole opening; thus, weakening the arm so that a pad retraction load may be controlled. The thickness of a portion of the arm may be reduced and this reduction in thickness may be a window in the deformable portion. For example, if a material is used that is 1 mm thick half the material may be removed to create a window in the deformable portion.

A window as described herein may be any change in material properties that weakens the arms. The deformable portion may include one or more windows. Preferably, the one or more windows may be internally located in the one or more arms (i.e. the windows are not in communication an outside edge of the arm). More preferably, the one or more windows may be internally located and externally located (i.e. a window may be in communication with an outside edge of the one or more arms). The one or more windows may be different sizes and shapes. The one or more windows may weaken the deformable portions of the arms so that the pad retraction load may be controlled (i.e. the force applied by the clip in the retract direction). The one or more windows may vary the strength of the one or more arms so that the amount of force the clip applies to the brake pad may be controlled, adjusted, or both. For example a smaller window may remove less material and, thus, by leaving more material the arm may provide more resistance during a brake apply and may apply a larger force on the brake pads during a brake retract. The size of the window may be inversely proportional to the thickness of the remaining material. The thickness of the remaining material may be proportional to the amount of force the clip applies on the brake pad during a brake retract. The amount of material removed by adding a window may vary the amount of force the clip applies to the brake pad in the retract direction.

The one or more windows may create one or more widths for the deformable portion (e.g. there may be two wavy portions with widths). The width of the one or more deformable portions may be varied. For example, the width of the material may be varied or the width of the remaining material may be varied so that deformability may be changed and/or adjusted from vehicle to vehicle. The width of the material may greater than about 0.5 mm, greater than about 1.0 mm, preferably greater than about 1.5 mm, or more preferably greater than about 2.0 mm (i.e. about 2.2 mm each). The width of the material may be less than about 15 mm, less than about 10 mm, preferably less than about 5 mm, more preferably less than about 3 mm. The arcuate portions 24 may include angles. A thinner material may deform more easily than a thicker material. A reduced width in the deformable portion may deform more easily than a clip with an increased width in the deformable portion. A clip for a compact car may have a reduced width and/or a thinner piece of material than a truck.

The arms may include one or more windows. The windows may be any portion on the arm that is an absence of material. The windows may be located anywhere along the length and/or width of the one or more arm. Preferably, the windows may be located near the arcuate portions. More preferably, the windows may be located at the arcuate portions, the deformable portions, or both. The windows may be symmetrical. The windows may be asymmetrical. The windows may be any shape. The windows may be square, rectangular, circular, oval, triangular, a hexagon, a straight line, a diagonal line, an "H" shape, multiple "H" shapes put together, a "T" shape, an "S" shape, the like, or a combination thereof. The windows may touch one edge of the arm. Preferably, the one or more windows may be located substantially in the center of the one or more arms. The one or more arms may have a material height in the radial direction above and/or below the window. The material height may be the height of the material remaining when the height is measured perpendicular to the axis of the apply direction and retract direction. For example, the window may have a length of about 32 mm and a height of about 12 mm, and a window may be placed in the arm so that the material thickness remaining above the window is about 2.2 mm and the remaining thickness below the window is about 2.2 mm in height (i.e. the window removed about 7.6 mm of material in the height direction). The height of remaining material above the window may be different than the height of the material below the window. Preferably, the height of the remaining material above the window may be substantially the same as the height of the remaining material below the window. The height of the material may greater than about 0.5 mm, greater than about 1.0 mm, preferably greater than about 1.5 mm, or more preferably greater than about 2.0 mm (i.e. about 2.2 mm each). The height of the material may be less than about 15 mm, less than about 10 mm, preferably less than about 5 mm, more preferably less than about 3 mm. The length of the window may be greater than about 1 mm, greater than about 2 mm, or even greater than about 3 mm. The length of the window may be less than 15 mm, less than 10 mm, or even less than 5 mm (i.e. about 4 mm).

The body portion and/or one or more arms may include one or more pad stops. Preferably, the one or more arms may include at least two pad stops. More preferably, the at least two pad stops may be located opposite each other on the one or more arms so that the at least two pad stops both contact an ear of the one or more brake pad. For example, a pad stop may be located on the bottom of the one or more arm and on the top of the one or more arm. The pad stops may project laterally away from the one or more arms. The pad stops may project perpendicularly to the one or more arms. Preferably, the pad stops may project out at an angle from the one or more arms. For example, a pad stop on the bottom of the one or more arms may project out and up towards the pad stop on the top of the arm, and the pad stop on the top may project down towards the pad stop on the bottom. The top pad stop may project out at an angle of greater than about a 15 degree angle, greater than about a 30 degree angle, or even greater than about a 45 degree angle when measured relative to the angled bracket. The bottom pad stop may project out at an angle of greater than about a 30 degree angle, greater than about a 45 degree angle, or even greater than about a 60 degree angle when measured relative to the body portion. The angle of the pad stop may change when an ear of the brake pad is placed in the pad stop. For example, the pad stop may be an angle of about 60 degrees from the back wall and when an ear is placed in the pad stop the angle may be changed to about a 75 degree angle. The angle of the top pad stop once an ear is placed in the pad stop may be an angle of greater than about 10 degrees, greater than about 15 degrees, or greater than about 20 degrees, or even greater than about 30 degrees from the angled bracket. The angle of the bottom pad stop once an ear is placed in the pad stop may be an angle of greater than about 45 degrees, greater than about 60 degrees, or even greater than about 75 degrees from the back wall. The at least one pad stop may temporarily secure the brake pads to the clip. The at least one pad stop may permanently secure to the brake pads to the clip. Preferably, the one or more pad stop may be fixedly secured to the brake pad. More preferably, the one or more pad stop may fixedly secure the brake pads to the clip, and the brake pads may be removed from the clip.

The clip may include one or more locators. Preferably, the one or more locators may be attached to the body portion of the clip. More preferably, the one or more locators may project from the opposite side of the body portion as the one or more arm. The one or more locators may be located on the outside edge of the body portion. Preferably, the one or more locators may be located on an inside edge of the body portion (i.e. furthest from the rotor). More preferably, the one or more locators may be located on an inside edge of the body portion so that the rotor passes next to the locator. The body portions of the clips may include more than one locator. For example, each body portion may have a locator on an inside edge and an outside edge of the body portion. The locator may project out from the body portion. The locator may project out and be planar to the body portion. Preferably, the locator is substantially perpendicular to the body portion of the clip. More preferably, the locator projects substantially perpendicular to the body portion and away from the arms (i.e. into contact with the support bracket). The locator may attach to the body portion of the clip opposite the arm portion. The locator may attach to the angled bracket of the clip. The size of the locator may be larger or smaller based on where the locator may be found on the clip. For example, a locator attached to the angled bracket may be smaller than a locator connected opposite the one or more arms.

The one or more locators may secure the clip to the support bracket so that the clip does not move relative to the support bracket and/or rotor. During each brake apply, the brake pads and the overlapping portion of the arms move toward the rotor until the brake pads contact the rotor on both its outboard face and inboard face. During each brake apply, the arms may deform elastically and then may deform plastically (i.e. permanently deform) so that the retraction load applied onto each brake pad is substantially the same. Upon a subsequent brake release, the overlapping portions of each of the arms may apply the retraction load as each arm deforms elastically (i.e. retraction load decreases at a constant rate) as the inboard brake pad and the outboard brake pad retract away from the rotor. The retraction load against each brake pad may be substantially equal, and the air gap between the inboard face of the rotor and the face of the inboard brake pad may be substantially the same as the air gap between the outboard face of the rotor and the face of the outboard brake pad. Thus, the brake pads may be centered with respect to the rotor by the clip.

The locator may assist in holding a clip in place. For example, the clip may not contact the abutment of the support bracket and the locator may fixedly hold the clip in place so that during a brake apply the force of the brake pads pushing against the clip does not push the clip into contact with the abutment. However, in another example, the clip may be pushed by the brake pad towards the abutment or into contact with the abutment and the locator may push the clip away from the abutment when the brakes are released. The locator may further assist in holding the clip in the abutment so that the clip does not slide in the apply direction or the retract direction. For example, during a brake apply the brake pads may push on the lip of the one or more arms and the locator may hold the body portion in place so that the deformable portions deform and the body portion does not move relative to the support bracket. The one or more locators may further assist in holding the clip in place during a brake retract so that as the deformable portions of the arm return to the pre-brake position (i.e. release their stored energy) the locator may hold the clip in place relative to the support bracket. A locator connected to the body portion opposite the one or more arms may more securely hold the clip in place when compared to the clip with the locator attached to the angled bracket. The locator attached to the body portion opposite the one or more arms may assist the clip in maintaining an angle relative to the abutment (i.e. the larger locator may resist some of the forces during a brake apply and maintain an angle between the body portion and/or arms and the abutment). The locator may form an angle with the body portion of the clip. The locator may form an angle between about 20 degrees and 140 degrees, preferably between about 45 degrees and 125 degrees, more preferably between about 75 degrees and 100 degrees (i.e. about 90 degrees). The locator may be substantially flat and planar. The locator may include an arcuate portion. The arcuate portion may form a raised surface so that the locator assists in holding the clip in the abutment. Preferably, the locator may projects out substantially perpendicular to the body portion and away from the arms. More preferably, the locator may project towards the support bracket and contact a wall of the support bracket so that the clip is held in place.

The clip may include an overlap portion. The one or more arms may include an overlap portion. The one or more arcuate portions may create an overlap. Preferably, the arcuate portion may form an angle sufficient so that the one or more arms project out and then arc back around such that a portion of the arm is overlapped by the portion of the arm that is folded back. The overlap portion may only contact the arm (i.e. itself). Preferably, the overlap portion may contact the arm and the body portion. The brake pad may move relative to the overlapped portion of the clip. The one or more pad stops may secure the ear of the brake pad against the one or more arms. Preferably, the one or more pad stops may secure the ear of the brake pad against the overlapped portion of the one or more arms. More preferably, the one or more pad stops may secure the ear of the brake pads against the overlapping portion of the arm so that during a brake apply and/or brake retract the brake pads do not move relative to the overlapping portion of the pad clip. It is contemplated that during a brake apply the arcuate portions, deformable portions, or both may deflect so that the overlapping portion moves with the brake pads during brake apply and brake retract (i.e. the overlapping portion of the clip moves with the brake pads as the brake pads move into contact with the rotor so that the brake pad does not move relative to the overlapping portion. For example, the overlapping portion (i.e. the top piece of the arm) of the clip, but does move relative to the overlapped portion (i.e. the bottom piece of the arm) of the clip. In another example, the ear of the brake pad may be secured in place by the pad stops and may contact the lip of the one or more arms so that during a brake apply and a brake retract the overlapping portion moves and the brake pad does not move relative to the overlapping portion. The overlapping portion may slide upon the overlapped portion of the arm and the body portion so that any friction occurs between the overlapping portion and the arm and/or body portion.

The overlap portion may be made of a low friction material that has a high resistance to abrasion. Preferably, the overlap portion is made of a smooth metal. More preferably, the overlap portion is made of stainless steel. The overlap portion may include a low friction coating, film, grease or low friction mechanical portion. For example, the overlap portion may include Teflon®, near-frictionless carbon, a bearing surface, graphite, or the like.

The overlap portion may be resistant to dirt, debris, fluid contamination, or the like. Preferably, the overlap portion may be self-cleaning. The overlap portion may clean itself so that when debris accumulates in the open area of the body portion, the overlapping portion may force the debris out so that the low friction surface may be maintained. The terminal end portion (i.e. the bottom of the lip) may clean a portion of the overlapped portion of the one or more arms, the body portion, or both. The lip may clean the clip as the clip is moved in the apply direction, the retraction direction, or both. Preferably, the bottom of the lip removes the debris to be cleaned in the apply direction when the brakes are applied so that the overlapping portion slides on a clean surface. More preferably, the bottom of the lip moves the debris to be cleaned as it moves in the apply direction so that the material to be cleaned is moved off of the overlapped portions of the one or more arms, the body portion, or both and the overlapping portion slides on a clean surface. For example, during a brake apply the lip begins at a position closer to the rotor than the pad ear, and as clip moves in the apply direction the bottom of the lip (i.e. the leading edge of the overlapping portion) may be the first portion to encounter debris so that the debris is moved out of the way and a clean sliding surface is created under the pad ear.

The clip may attach to a portion of the brake. The clip may attach to the brake caliper. Preferably, the clip may attach to the support bracket. More preferably, the clip may be placed in an abutment and around a top arm of the support bracket. The clip may be temporarily secured in the abutment of the support bracket. The clip may be fixedly secured in the abutment of the support bracket. Preferably, the clip may be removably secured in the abutment of the support bracket (i.e. the clip may be locked in the abutment and removed when changing the brake pads). The angled bracket may attach the clip to the top arm of the abutment. The angled bracket may fixedly secure the clip to the top arm of the abutment. The angled bracket may removably secure the clip to the top arm of the abutment.

The one or more clips included in the brake system may be identical. Preferably, the clips used will be different. More preferably, the brake system will use an angled clip on the side of the support bracket that is in the direction of rotation of the rotor (i.e. the leading edge), and a non-angled clip on the side of the support bracket that is facing opposed to the direction of rotation of the rotor (i.e. trailing edge). The body portion of the clip, the one or more arms, or both may be in contact with the abutment. The body portion, the one or more arms, or both may completely contact the abutment where the body portion and/or the one or more arms are in the abutment. The body portion, more arms, or both may be substantially parallel to the abutment so that all of the arms and/or body portion is in contact with the abutment. Preferably, the clip, the body portion, and/or the one or more arms may be partially in contact with the abutment. For example, the body and/or arms may angle away or towards the abutment so that only a portion of the clip contacts the abutment. Preferably, the clip located in the leading edge of the support bracket is angled away so that when the vehicle is moving forward the clip does not contact the abutment. More preferably, the clip located in the trailing edge of the support bracket may substantially contact the abutment. The body portion and/or arms may angle away from and/or towards the abutment and an angle greater than about 5 degrees, greater than about 10 degrees, or even greater than about 15 degrees. The body and/or arms may have one angle when the clip is not housing an ear of the brake pad, and another angle when the clip and ear of the brake pad is secured in the clip. For example, an empty clip may have an angle of greater than about 5 degrees and a clip housing the brake pads may have an angle of between about 0 degrees and about 4 degrees. The angle of the clip relative to the abutment when the clip is housing the brake pad may be greater than about 0 degrees, greater than about 5 degrees, or even greater than about 10 degrees. The angle of the clip may vary during a brake apply and/or brake retract by greater than about 1 degree, greater than 5 degrees, or even greater than about 10 degrees. The support bracket may include one or more clips. Preferably, the support bracket includes two clips or four clips. The clips may have the same angle relative to the abutment. Preferably, the clips may have different angles relative to the abutment. More preferably, one or more clips on one side may completely contact the abutment, and the one or more clips on the opposite side of the brake pads may form an angle to the abutment. The clip may form an angle with the top arm of the abutment, the bottom arm of the abutment, or both. Preferably, the one or more clips may partially and/or completely contact a wall of the abutment that connects the top arm and the bottom arm (i.e. back wall).

The clip may include one or more angled brackets. The one or more angled brackets may mirror (i.e. follow or match) a portion of the support bracket. Preferably, the one or more angled brackets form a "U" shape or a "C" shape. More preferably, the one or more angled brackets may substantially conform to the shape of a top arm of the abutment and assist in retaining the clip in place so that the clip does not move during operation. The one or more angled brackets may include one or more windows. The one or more windows may be located anywhere along the length, width, height, or a combination thereof of the angled bracket. The one or more window of the angled bracket may be of any shape. The one or more window may be oval, circular, square, rectangular, or a combination thereof. Preferably, the one or more window of may be "U" shaped. The one or more windows may assist the angled bracket of the clip in securing the clip to the top arm of the support bracket. The one or more windows may form an angle to the angled bracket and the angle may secure the clip to the top arm of the support bracket.

The clip may assist in pushing, pulling, or both the one or more brake pads in the retract direction (i.e. away from the rotor in the axial direction relative to the rotor). The one or more clips may exert an axial force in the retract direction of more than about 5 N, more than about 10 N, more than about 15 N, more than about 20 N, more than about 25 N, or even more than about 30 N. One clip may provide an axial force and one clip may not provide an axial force. Preferably, both clips may exert an axial force in the retract direction; for example, one clip may exert a force of about 20 N and two clips may exert a force of about 40 N on each brake pad. Two clips may exert a force of more than about 10 N, more than about 20 N, more than about 30 N, more than about 40 N, more than about 50 N, or even more than about 60 N. Preferably, the brake may include an inboard brake pad and an outboard brake pad and the one or more clips will apply substantially the same amount of force to both brake pads in the retract direction.

The one or more arms may include a lip. The lip may be located at any location on the clip. The lip may be located on an arm of the clip. Preferably, the lip may be located at a terminal end of the one or more arms. More preferably, the lip may be located at the end of the one or more arm that is overlapped on top of the first layer of the one or more arm. For example, the lip may be located in such a location that when the brake pad ear rests against the stops the lip is moved about 1.5 mm axially, and this creates a load against of the pad ears of between about 20 N to about 30 N. The lip may contact the one or more brake pad. Preferably, every arm may include a lip and each lip may contact one brake pad. More preferably, the one or more lips may contact the ear of the brake pad, or vice versa. The lip may have a height (i.e. the distance from the bottom of the overlapped portion to the tip of the lip). The height of the lip may be short enough so that the lip may contact an ear of the brake pad without contacting the friction material. The height of the lip may be tall enough so that the lip is capable of moving the brake pad during brake retraction. The height of the lip may be tall enough so that when a brake pressure is applied the one or more brake pad may axially move the lip and when the brake apply is finished the lip may axially move the one or more brake pads in the retract direction. Preferably, the lip may not have a height greater than an arcuate portion. The lip may be more than about 1.0 mm, preferably more than 2.0 mm, or more preferably more than 3.0 mm.

Figure 1:
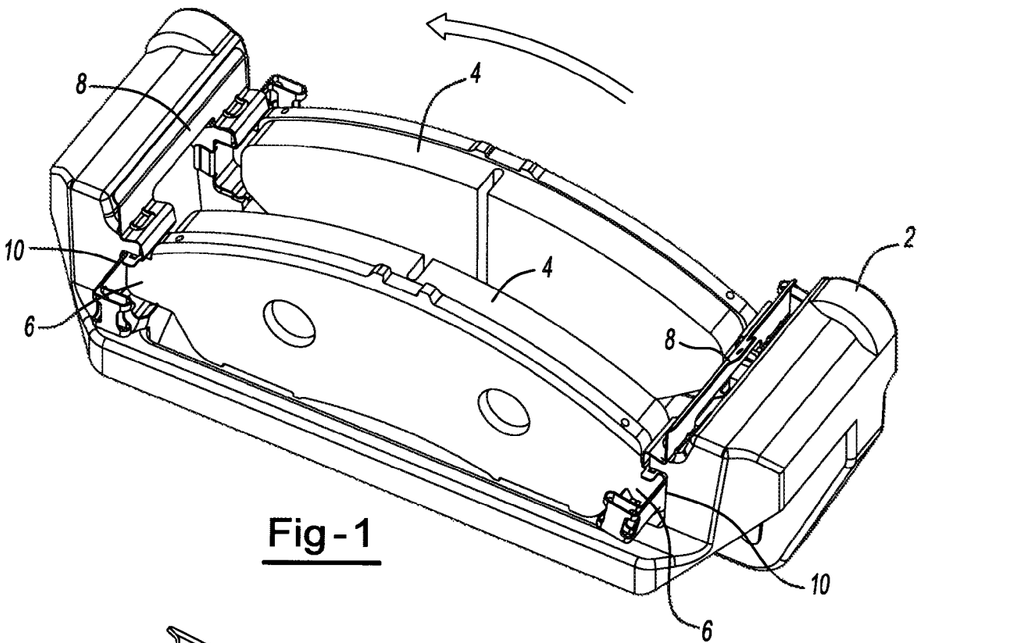
FIG. 1 shows a perspective view of a brake system including a clip.

FIG. 1 illustrates one embodiment of a clip in a support bracket. The support bracket includes a rotor (not shown) between the brake pads 4. The rotor rotates about an axis as shown by an arrow. The support bracket 2 may include an abutment 10. The clip 8 may be placed in proximity to the abutment 10. The one or more brake pads 4 may include one or more ears 6, and the one or more ears 6 may be placed in the one or more clips 8, which are located in communication with the abutment 10 so that the brake pads are attached to the support bracket.

Figure 2:
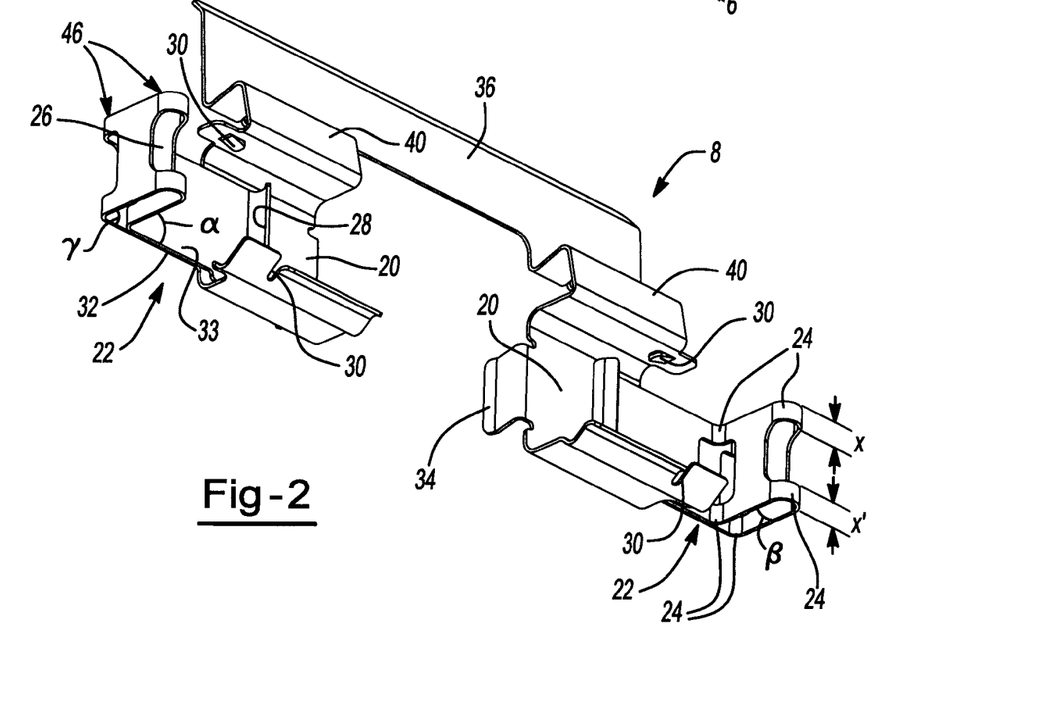
FIG. 2 illustrates a view of one embodiment of the present invention.

FIG. 2 illustrates one embodiment of a clip. The clip 8 may include a body portion 20. The body portion 20 may include a bridge 36 and an angled bracket 40. The body portion may include one or more locators 34. The locators 34 may extend from the body portion of the clip proximate to the one or more arms and assist in retaining the clip in place. The body portion may include one or more arms 22. The one or more arms 22 may include a lip 28 at the end of the overlapping portion 33. The one or more arms 22 may include one or more pad stops 30. The one or more arms 22 may include one or more arcuate portions 24. The one or more arms 22 may further include one or more windows 26 in the one or more arcuate portions 24. The one or more arms 22 may have a width (X) above the window 26 and a width (X') below the window. The width (X) and (X') may be different. Preferably, the width (X) and (X') may be substantially the same. The width of (X) and (X') may be between about 0.1 mm and about 20 mm, between about 0.2 mm and about 15 mm, preferably about 0.5 mm and 10 mm, more preferably between about 1.0 mm and about 5.0 mm (i.e. about 2.2 mm). The arcuate portions 24 may include one or more angles.

The one or more arcuate portions may include an angle ($\alpha$). The angle ($\alpha$) may be any angle capable of creating an overlapped portion 32. The angle ($\alpha$) may be an angle between about 0 degrees and about 180 degrees, between about 30 degrees and about 150 degrees, preferably between about 45 degrees and about 115 degrees, and more preferably between about 60 degrees and about 100 degrees (i.e. about 90 degrees). The angle ($\gamma$) may be any angle capable of creating an overlapped portion. The angle ($\gamma$) may be an angle between about 0 degrees and about 180 degrees, between about 30 degrees and about 150 degrees, preferably between about 45 degrees and about 115 degrees, and more preferably between about 60 degrees and about 100 degrees (i.e. about 90 degrees). The angle of ($\alpha$) and ($\gamma$) may be different. Preferably, the angle of ($\alpha$) and ($\gamma$) may be substantially the same. More preferably, the angle of ($\alpha$) and ($\gamma$) may be the same. The one or more arcuate portions may include an angle ($\beta$). The angle ($\beta$) may be any angle capable of creating an overlapped portion. The angle ($\beta$) may be any angle between about 0 degrees and about 270 degrees, between about 45 degrees and about 250 degrees, preferably between about 90 degrees and about 235 degrees, more preferably between about 135 degrees and about 205 degrees (i.e. about 180 degrees). The angles ($\alpha$), ($\beta$), and ($\gamma$) and may be any combination of angles capable of creating an overlapping portion. The angles ($\alpha$), ($\beta$), and ($\gamma$) may deform by any angle, which allows the clip to maintain a small air gap. A small air gap is any clearance where the brake pads do not contact the rotor while the vehicle is moving and where the brake pedal does not feel soft during a brake apply. The angles ($\alpha$), ($\beta$), and ($\gamma$) may vary by more than about 1 degree, about 3 degrees, about 5 degrees, or even about 7 degrees. A deformation of the angles (α), (β), and (γ) may vary the location of the lip, brake pads, or both by a length of more than about 1.0 mm, about 2.0 mm, about 3.0 mm, about even 5.0 mm, or about as much as the friction material thickness (i.e. between about 8 mm to about 15 mm).

Figure 3:
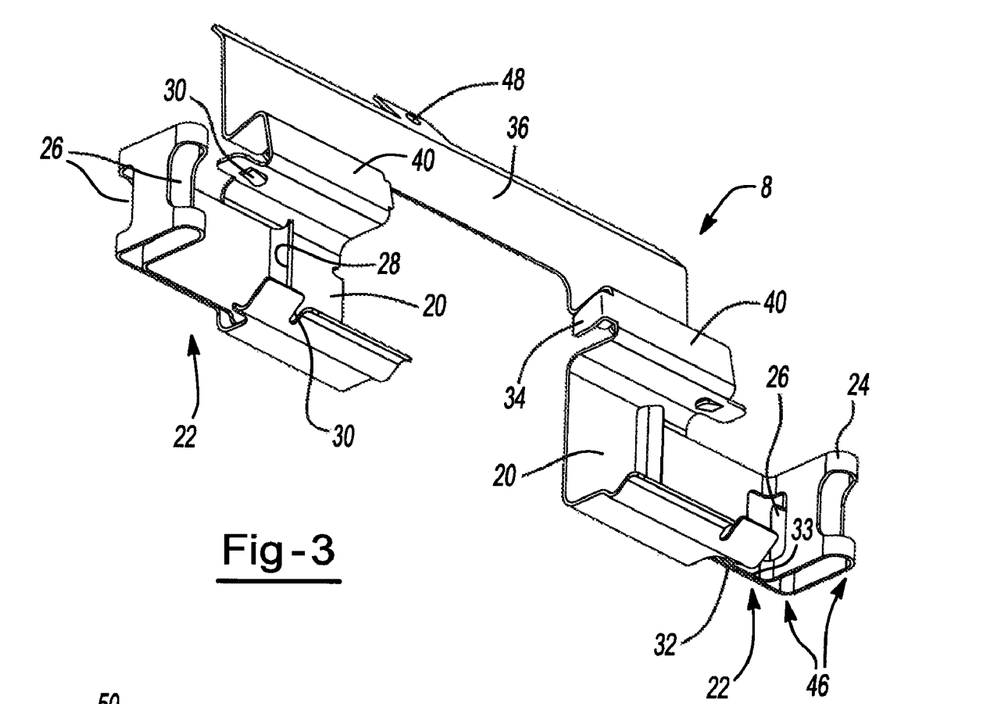
FIG. 3 illustrates a view of another embodiment of the present invention.

FIG. 3 illustrated another possible embodiment of the present invention. The clip 8 may include one or more body portions 20, one or more arms 22, and one or more arcuate portions 24. The one or more arcuate portions 24 may be located on the one or more arms 22 and may include one or more windows 26. The clip of FIG. 3 may include any or all of the angles discussed herein for FIG. 2. The arms may further include one or more overlapped portions 32 and one or more lips 28. The body portion 20 may include one or more angled bracket 40, one or more pad stops 30, and one or more locators 34. One locator may be located on the edge closes to the rotor and the other locator may be located on the opposite edge farthest from the rotor (not shown). The one or more locators 34 may be attached to the one or more angled brackets 40 and may assist in holding the clip in connection with the support bracket (not shown). The bridge 36 may include a tab 48.

Figure 4:
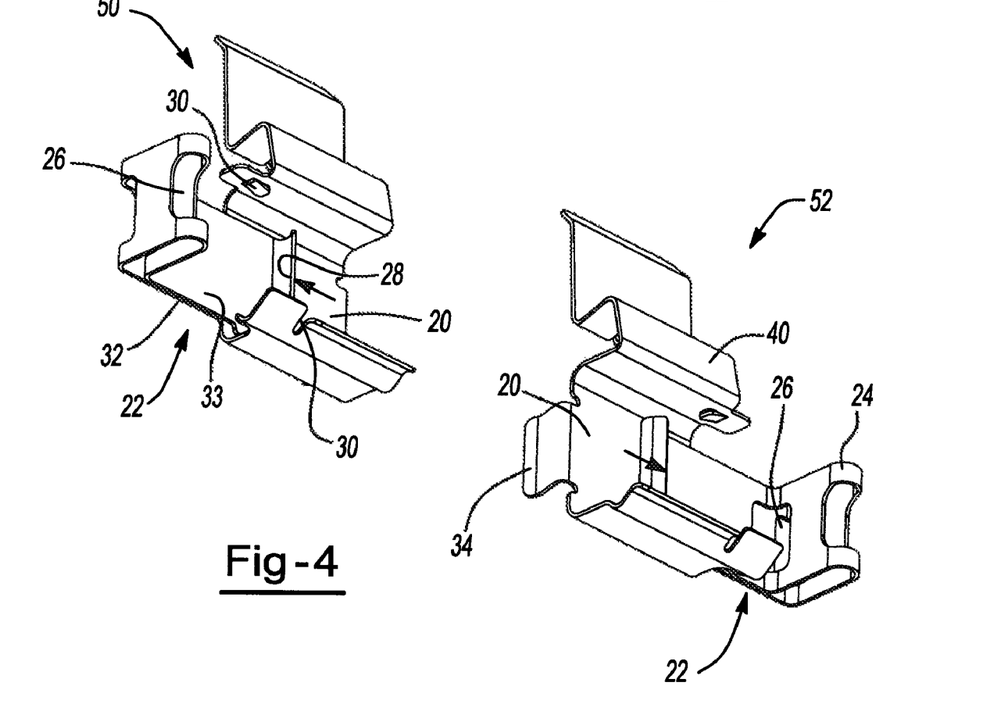
FIG. 4 illustrates a view of one embodiment of the present invention with a right side and a left side.

FIG. 4 illustrates another possible embodiment of the present invention. It is contemplated that the clip does not include a bridge portion so that two discrete clips may be used. There may be a left handed clip 50 and a right handed clip 52, which may be opposite mirror images of each other. Both of the clips may include a body portion 20 with one arm 22. The one arm 22 may include a lip 28, one or more arcuate portions 24, one or more windows 26, an overlapped portion 32, an overlapping portion 33, or a combination thereof. The body portion may further include an angled bracket 40, and one or more pad stops 30. The clip described herein of FIG. 4 may include any and/or all of the angles discussed herein for FIG. 2. The overlapping portion 33 and the one or more lips 28 may move in the retract direction as indicated by the arrows.

Figure 5:
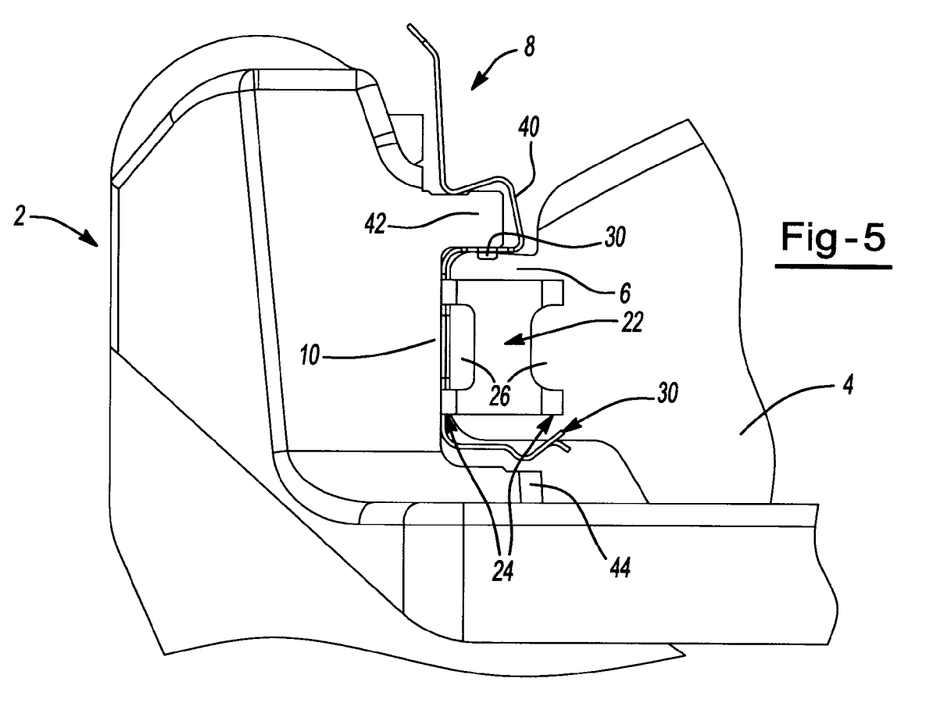
FIG. 5 illustrated a cross section of one embodiment of the present invention.

FIG. 5 illustrates a side view of one embodiment of a clip 8 that is in a support bracket 2. The support bracket 2 may include an abutment 10, which may include a top arm 42 and a bottom arm 44. The body portion may include an angled bracket 40, which forms an interference fit with the top arm 42 of the abutment 10 of the support bracket 2. The body portion includes one or more pad stops 30. The ear 6 of the brake pad 4 may fit in the clip and be held in place by the pad stops 30. The one or more arms 22 may include one or more arcuate portions 24 and may include one or more windows 26.

Figure 6:
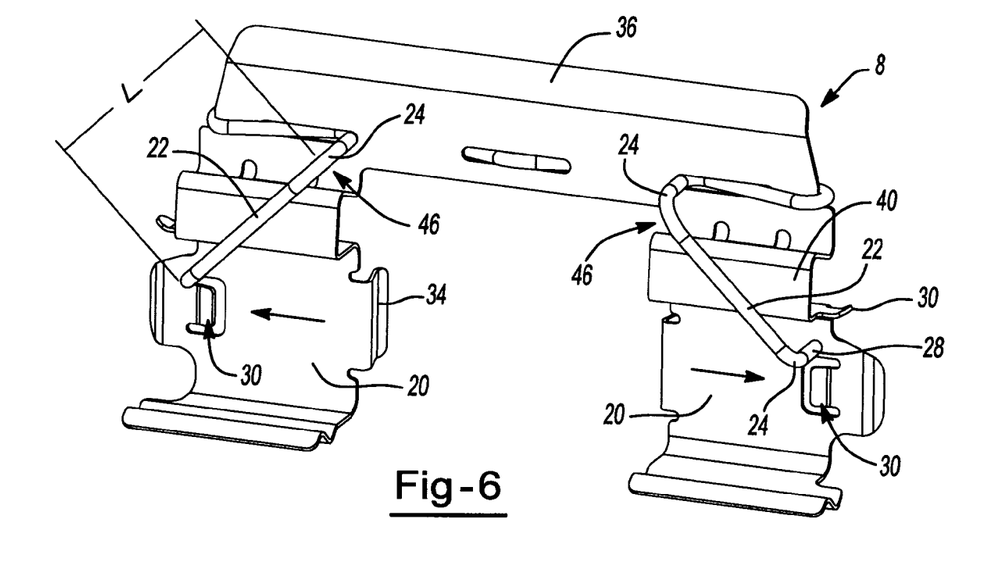
FIG. 6 illustrates a view of another embodiment of the present invention.

FIG. 6 illustrates another embodiment of a clip 8. The clip 8 may include a body portion 20, a bridge 36, and one or more discrete arm portions 22, which mount onto clip 8. It is contemplated that the clip may be free of a bridge 36 and, thus, creating two discrete clips. The one or more arm portions 22 may include one or more arcuate portions 24. The one or more arm portions 22 may include one or more lips 28. The one or more arm portions 22 may include a lip 28 and the lip may move the brake pads (not shown) in the retract direction that is indicated by the arrows. The one or more arm portions, arcuate portions 24, or a combination thereof may be a deformable. The one or more lips may apply an axial force on an ear of the brake pad (not shown) in the retract direction as indicated by the arrows. The body portion 20 may include one or more pad stops 30. The body portion 20 may further include one or more locators 34. The body portion 20 may include one or more angled brackets 40 that form an interference fit with the abutment 10 of the support bracket 2. The one or more arms 22 may have a length (L). All of the arms may be the same length. However, the length of the arms may vary.

The (L) of the one or more arm maybe more than about 10 mm, preferably more than about 15 mm, or more preferably more than about 20 mm.

Figure 7:
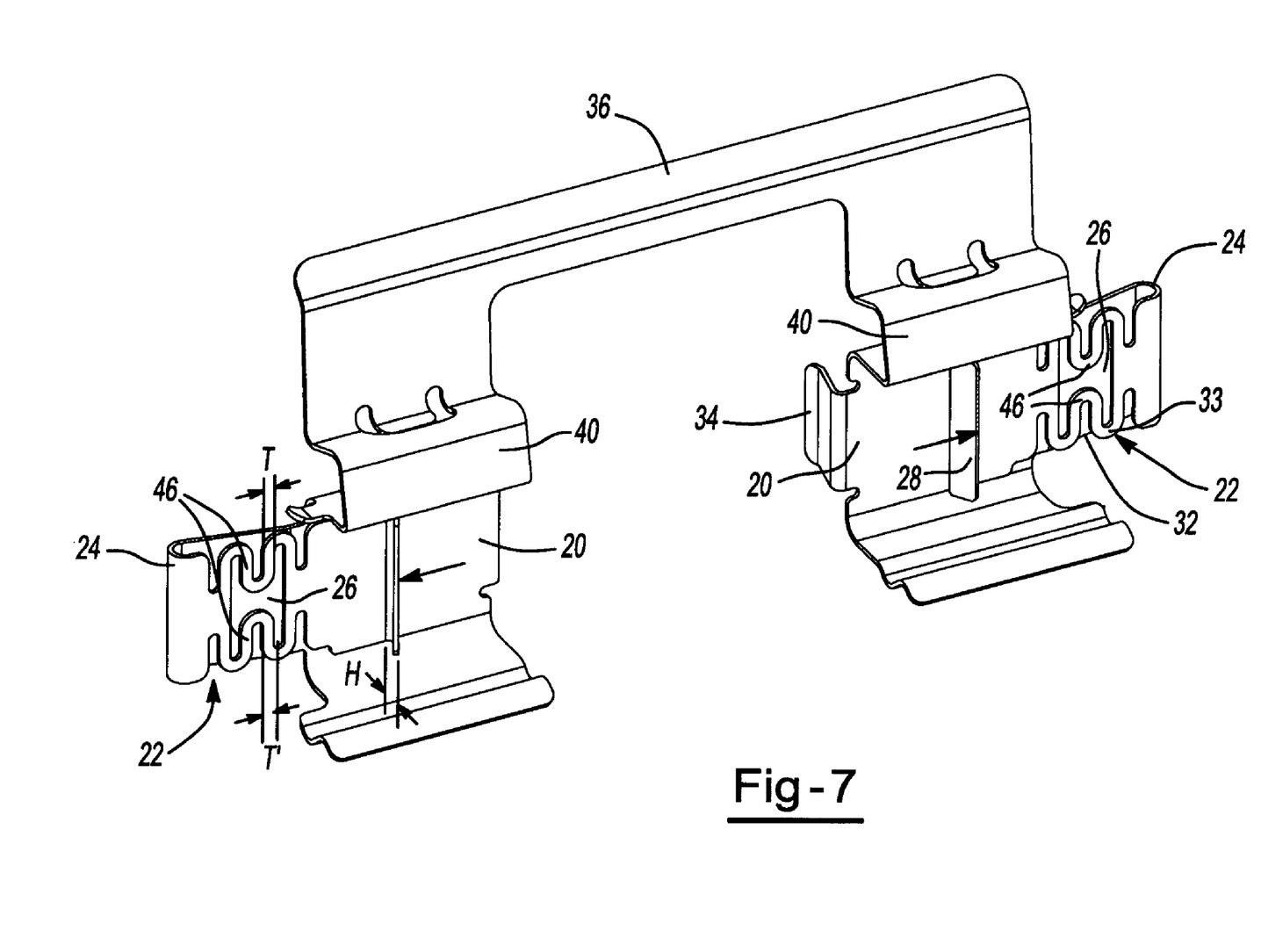
FIG. 7 illustrates a view of another embodiment of the present invention.

FIG. 7 illustrates another embodiment contemplated by the teachings discussed herein. The clip may include a body portion 20, one or more arms 22, and a bridge 36. It is contemplated that the clip may be free of a bridge 36 and, thus, creates two discrete clips. The one or more arms may include an arcuate portion 24, one or more windows 26, a lip 28, an overlapped portion 32, and a overlapping portion 33. The one or more lips 28 may have a height (H). The height of the one or more lips may be any height so that contact with the brake pad is maintained and the lip and brake pad move simultaneously with each other. The height (H) of the lip may be between about 0.5 mm and about 5.0 mm, between about 1.0 mm and 3.0 mm, or between about 1.5 mm and about 2.5 mm. The one or more arms may include a deformable portion 46. The one or more deformable portions 46 may include a width (T) and (T'). The width of (T) and (T') may be different. Preferably, the width of (T) and (T') may be the same. The width of (T) and (T') may be any width capable of retracting one or more brake pads. The width of (T) and (T') may be any t width that creates a force between about 5 N to about 30 N for each arm. The width of (T) and (T') may be between about 0.5 mm to about 5.0 mm, between about 1.0 mm to about 3.0 mm, or between about 1.5 mm and 2.5 mm. The body 20 may include one or more pad stops (not shown), one or more angled brackets 40, and one or more locators 34.

Figure 8A:
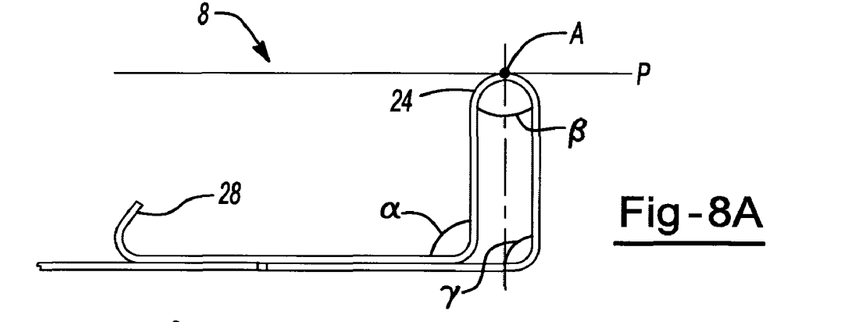
FIGS. 8A-8B illustrate examples of a clip before a brake apply and a clip deforming out-of-plane during a brake apply.
Figure 8B:
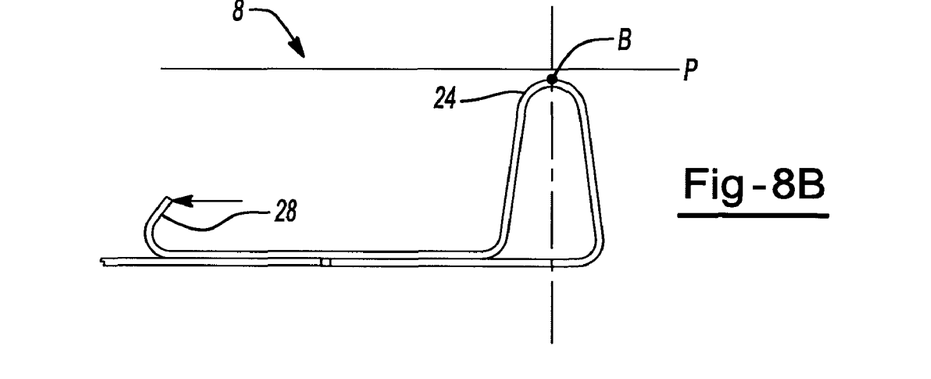

FIGS. 8A-8B illustrate examples of the clip 8 deforming during a brake apply. FIG. 8A shows a cross-sectional plan view of one arm of a clip. For example, the clip may have a point A located on a plane (P) when the clip is in a resting position (e.g. before and/or after a brake apply). FIG. 8B shows a cross-sectional plan view of the clip during a brake apply (e.g. when the brake pad pushes on the lip 28 in the direction of the arrow) where the clip deforms. The deformation moves the point to a location B that is located substantially out-of-plane (P). In FIG. 8B the deformable portion is moved out-of-plane (P) by a brake pad 4 acting on a lip 28. FIG. 8A illustrates a cross-sectional view of the clip and shows angles (α), (β), and (γ) which may be any combination of angles capable of creating an overlapping portion. The angles (α), (β), and (γ) may be any of the angles discussed herein.

Figure 9A:
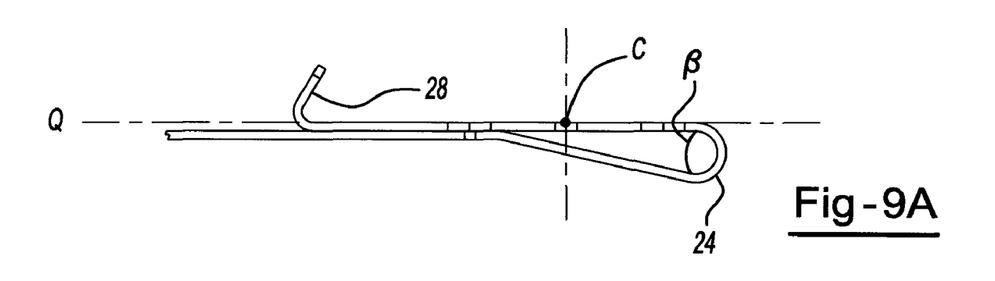
FIGS. 9A-9B illustrate examples of a clip before a brake apply and a clip deforming in-plane during a brake apply.
Figure 9B:
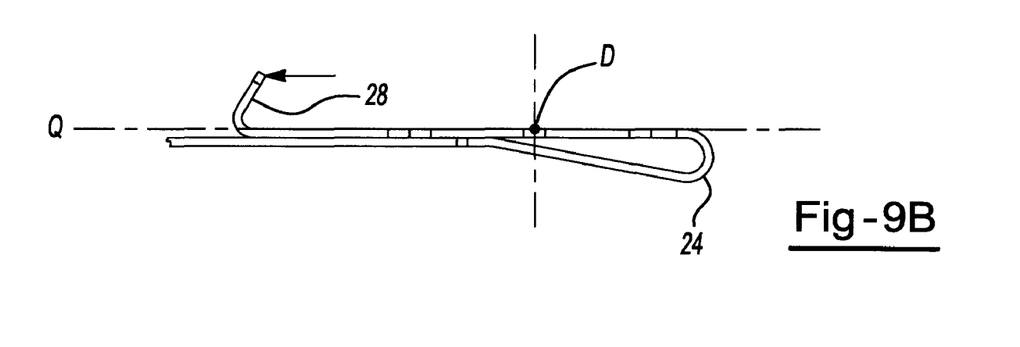

FIGS. 9A-9B illustrate examples of the clip deforming during a brake apply. FIG. 9A shows a top plan view of one arm of a clip. For example, the clip may have a point with a location C that is located in a plane (Q) when the clip is in a resting position (e.g. before and/or after a brake apply). FIG. 9B shows a top plan view of the clip during a brake apply (e.g. when the brake pad pushes on the lip 28 in the direction of the arrow) where the clip deforms. The deformation moves the point to a location D that is located substantially on plane (Q). In FIG. 9B the deformable portion is moved in-plane (Q) by a brake pad 4 acting on lip 28. FIG. 9A illustrates a cross-sectional view of the clip and shows angle (β), which may be any that is capable of creating an overlapping portion. Angle (β) may be any angle discussed herein.

The present invention is a clip that holds an ear of a brake pad in place, and assists in returning the brake pad to substantially it pre-brake location so that, if present, an air gap may be maintained on both sides of the rotor. The clips are attached to a support bracket and the brake pads are placed in the clip, parallel to a rotor. A caliper body that includes a brake piston is then placed over the brake pads and rotor. During a brake apply the brake piston travels axially, in relationship to the rotor, into contact with the brake pads. The brake pads during a brake apply contact the lip of an arm of the clip and move the lip so that the deformable portions deform and store energy. When brake pressure is released the stored energy is used to move the brake pad in the retract direction. During brake retract the lip contacts the brake pad and moves the brake pad in the retract direction.

The invention may include: arms wherein each arm applies an axial force on an ear of a brake pad in the retract direction; one or more windows located in the deformable portion of the one or more arms; the deformable portion is curved so that it generally forms an L shape; the one or more arms have portions that overlaps the arms, the body portion, or both so that there are two layers and the two layers are in contact; the overlap portions of the arm slide upon themselves, the body portion, or both so that the brake pad does not move relative to the arm of the clip, the overlapped portion, or both; the one or more arms include an arcuate portion so that the arm forms one or more curves and the one or more arms are folded upon themselves; and the body portion, one or more arms, deformable portion, and lip are one integrally formed piece.

It is further contemplated that the present invention may include: the clip fits into the abutment portion of a brake support bracket and an ear of a brake pad fits into the clip; the clip forms an interference fit with the brake support bracket so that the clip is held in place; the one or more windows are located in the center of the arms so that the windows are surrounded by material; the one or more arms are a discrete part and are attached to the body portion; the body portion substantially follows the shape of a brake support bracket so that the clip fits into the body portion and an ear of a brake pad fits into the clip; the one or more arms are made of a material with a circular or rectangular cross section; the one or more arms are made of a wire material; the clip is made from a metal sheet, roll, coil, or a combination thereof; a material from which the clip is formed of is between about 0.1 mm to about 1 mm in thickness; the deformable portion is in a plane and during deformation the deformable portion is moved substantially out-of-plane; the deformable portion is in a plane and during deformation the deformable portion remains substantially in-plane; and the one or more arms are either a low friction material or are coated with a low friction material.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A clip comprising:
    a) a body portion;
    b) one or more arms connected to the body portion and projecting away from the body portion;
    c) a deformable portion in the one or more arms that is distal from the body portion; and
    d) a lip on the one or more arms that is proximate to the body portion;
        wherein the one or more arms have an overlap portion that folds back upon the arms, the body portion, or both so that the one or more arms form two layers; and
        wherein the overlap portion of the one or more arms slide upon the one or more arms, the body portion, or both so that a brake pad does not move relative to the one or more arms, the overlap portion, or both.

2. The clip of claim 1, wherein each arm applies an axial force on an ear of a brake pad in the retract direction.

3. The clip of claim 1, further including one or more windows located in the deformable portion of the one or more arms.

4. The clip of claim 1, wherein the deformable portion is curved so that the one or more arms and the deformation portion generally form an L shape.

5. The clip of claim 1, wherein the body portion, one or more arms, deformable portion, and lip are one integrally formed piece.

6. The clip of cairn 1, wherein the clip fits into the abutment portion of a brake support bracket and an ear of a brake pad fits into the clip.

7. The clip of claim 1, wherein the clip forms an interference fit with a brake support bracket so that the clip is held in place.

8. The clip of claim 3, wherein the one or more windows are located in a center of the one or more arms so that the windows are surrounded by material.

9. The clip of claim 1, wherein the body portion substantially follows a shape of a brake support bracket so that the clip fits into the body portion and an ear of a brake pad fits into the clip.

10. The clip of claim 1, wherein the one or more arms are made of a material with a circular or rectangular cross section.

11. The clip of claim 1, wherein the clip is made from a metal sheet, roll, coil, or a combination thereof.

12. The clip of claim 1, wherein a material from which the clip is formed of is between about 0.1 mm to about 1 mm in thickness.

13. The clip of claim 1, wherein the deformable portion is in a plane and during deformation the deformable portion is moved substantially out-of-plane.

14. The clip of claim 1, wherein the deformable portion is in a plane and during deformation the deformable portion remains substantially in-plane.

15. The clip of claim 1, wherein the one or more arms are either a low friction material or are coated with a low friction material.

16. The clip of claim 1, wherein the deformable portion during each brake apply both plastically deforms and elastically deforms so that the lip after a brake apply moves towards a pre-brake apply position but not back to the pre-brake apply position after each brake release.

17. The clip of claim 3, wherein the window in the one or more arms is an absence of material.

18. The clip of claim 1, wherein the deformable portion in the one or more arms is a wavy configuration so that the arm moves in the apply direction, the retract direction, or both.

19. The clip of claim 1, wherein the deformable portion deforms as a brake pad wears and/or rotor wears so that the clip compensates for a reduction in brake pad and/or rotor material thickness.

20. The clip of claim 1, wherein the overlap portion is self-cleaning so that any debris is removed from the overlap portion and friction and/or noise are reduced.

* * * * *